(12) United States Patent
Cosson

(10) Patent No.: US 8,182,300 B2
(45) Date of Patent: May 22, 2012

(54) CANINE FLOTATION APPARATUS

(75) Inventor: Clare Cosson, Hokitika (NZ)

(73) Assignee: D-FA Ltd., Wanaka (NZ)

( * ) Notice: Subject to any disclaimer, the term of this patent is extended or adjusted under 35 U.S.C. 154(b) by 91 days.

(21) Appl. No.: 12/660,636

(22) Filed: Mar. 2, 2010

(65) Prior Publication Data

US 2010/0240272 A1    Sep. 23, 2010

Related U.S. Application Data

(60) Provisional application No. 61/210,268, filed on Mar. 18, 2009.

(51) Int. Cl.
*B63C 9/08* (2006.01)
(52) U.S. Cl. ........................ 441/123; 119/856
(58) Field of Classification Search .................. 119/856, 119/858, 907; 441/88, 106, 123, 114, 117, 441/119
See application file for complete search history.

(56) References Cited

U.S. PATENT DOCUMENTS

| | | | | |
|---|---|---|---|---|
| 5,632,235 A | * | 5/1997 | Larsen et al. | 119/856 |
| 5,738,043 A | * | 4/1998 | Manuel | 119/907 |
| 5,894,817 A | * | 4/1999 | Manuel | 119/907 |
| 6,659,824 B1 | * | 12/2003 | McCormick | 441/88 |
| 7,559,817 B2 | * | 7/2009 | Von Zell | 441/123 |

* cited by examiner

*Primary Examiner* — Lars A Olson

(57) ABSTRACT

An improved canine flotation apparatus that uses a segmented panel construction and varying densities of foam within the panels of the apparatus to comfortably and evenly float canines of a wide variety of weights and dimensions. The chest yoke panel and belly panel cradles the canine in the apparatus, helping to keep the head above water. The chest yoke panel further provides a measure of insulation around the heart and lungs, permits easier lifting of the canine due to the more secure fit and facilitates more natural movement by the canine in the water.

16 Claims, 5 Drawing Sheets

CANINE FLOTATION APPARATUS

CROSS REFERENCE TO RELATED APPLICATION

This application claims the benefit of U.S. Provisional Application No. 61/210,268 filed on Mar. 18, 2009, entitled "Canine Flotation Apparatus".

FIELD OF THE INVENTION

The present invention relates to flotation devices used with, inter alia, canines, and in particular, dogs, for supporting the weight of the canine when in water.

BACKGROUND

Conventional canine flotation devices are typically used for the same reasons that a personal flotation device are used with children. These flotation devices keep pets safe around a body of water, pool or in a boat. Some canines, especially breeds with low body fat, have less buoyancy in the water. In such case, a flotation device provides extra buoyancy for a measure of safety. This is important as young canines and older canines have less muscular ability and stamina to keep their heads above water for a long period of time. Further, hunting canines that are retrieving water fowl may become fatigued in cold water. For these reasons, the use of a flotation device with a canine is recommended.

The use of a flotation device is also recommended when a canine is in a boat or around a body of water. If the canine jumps or falls overboard or gets caught in a current, having a flotation device can help the canine remain afloat until it is rescued. Hence, flotation devices often come in bright safety colors making it easier to see a canine in the water. Further, these flotation devices may have a handle on the back thereof enabling one to pull a canine out of the water.

Although there are a number of reasons for using a flotation device with a canine, there are a number of disadvantages associated with conventional canine flotation devices. Generally, they are cumbersome, fit poorly and impede movement in the water. Lifting handles on these conventional flotation devices, in combination with the poorly designed conventional flotation devices, often do not properly distribute a canine's weight. As a result, the canine is uncomfortable and at risk of falling though the device when lifted. Further, conventional flotation devices typically provide limited or no buoyancy in critical areas such as the chest and brisket area, making it more difficult for the canine to hold its head above water. Finally, conventional floatation devices fail to insulate the canine from cold around its heart and lungs.

A further disadvantage of many conventional flotation devices is that they secure the front of the jacket with a strap across the chest and do not provide flotation means under the chest between the front legs. This arrangement causes the canine to "hang" from the conventional flotation device above the water rather than being cradled in the device. Further, the head of the canine is given little if any flotation support in such an arrangement. A further disadvantage of many conventional flotation devices is that they include a belly strap that is located just behind the front legs, thus constraining front leg movement.

Many of the cited disadvantages are a result of the conventional flotation devices being made from a single piece of foam that is scored and wrapped around the canine and secured with straps. Such conventional flotation devices may have exterior stitching to suggest the use of a plurality of panels, but in essence are merely decorative and have little function. Because these conventional flotation devices are made from a single piece of foam, they tend to fit poorly, are less comfortable, and, disadvantageously provide less effective buoyancy.

The present invention overcomes the cited disadvantages of the conventional flotation devices.

SUMMARY OF THE INVENTION

The following presents a simplified summary of the present invention in order to provide a basic understanding of some aspects thereof. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

The Background section describes a number of disadvantages with conventional canine flotation devices. What is desired is a canine flotation apparatus that (i) uses different densities of foam in segmented panels to proved predetermined flotation characteristics depending on the panel in which it is used; (ii) a chest yoke that joins a belly panel to accommodate front legs of a canine; (iii) has an upper back panel that is a continuous piece that couples to the chest yoke panel, in front of the shoulders; and (iv) the belly panel having no exposed strapping so as to (A) lessen the risk of snagging on debris in the water, and (B) contribute to the canine's comfort, fit and buoyancy.

The present invention is an improved canine flotation apparatus that uses a segmented panel construction and varying densities of foam within the panels of the apparatus to comfortably and evenly float canines of a wide variety of weights and dimensions by taking into account the weight distribution of the canine. The chest yoke panel and belly panel of a disclosed embodiment of the present invention cradles the canine in the apparatus, helping to keep the head above water. The chest yoke panel further provides a measure of insulation around the heart and lungs, permits easier lifting of the canine due to the more secure fit and facilitates more natural movement by the canine in the water.

DESCRIPTION OF THE DRAWINGS

A more complete understanding of the present invention may be obtained by reference to the following Detailed Description, when taken in conjunction with the accompanying Drawings, wherein.

DETAILED DESCRIPTION

The present invention will now be described more fully with reference to the accompanying drawings, in which certain embodiments of the present invention are shown. The present invention may, however, be embodied in many different forms and should not be construed as limited to the embodiments set forth herein; rather, these embodiments are provided so that this disclosure will be thorough and complete, and will fully convey the scope of the present invention to those skilled in the art. The measurements listed on FIGS. 1A-1E are only representative of one of many embodiments of the present invention and are provided to illustrate the relative sizes of each of the panels. The measurements of FIGS. 1A-1E are not intended to limit the invention to the sizes set forth therein.

The present invention is directed to an improved canine flotation apparatus using segmented panel construction and varying densities of buoyant material therein to comfortably and evenly float canines of a wide variety of weights and dimensions. The buoyant material is preferably a foam, including a closed cell foam. Representative foam includes a poly vinyl chloride (PVC) and isocyanate blend (referred to as PVC foam). Other foams based on chemical components other than PVC may, depending on the need of the manufacturer, include non-toxic versions of linear PVC, polystyrene, styreneacrylonitrile, polyurethan, polyisocyanurate, polymethylmethacrylate or polyetherimide. Each type of foam has different physical and mechanical properties due to their chemical differences.

The construction of the present invention effectively cradles the canine, and is configured to, inter alia, (i) assist the canine in keeping its head above water; (ii) provide a more secure fit so as to allow easier lifting of the canine by a lifting handle; and (iii) facilitate a more natural movement of the canine's legs in the water.

Figure 1A:
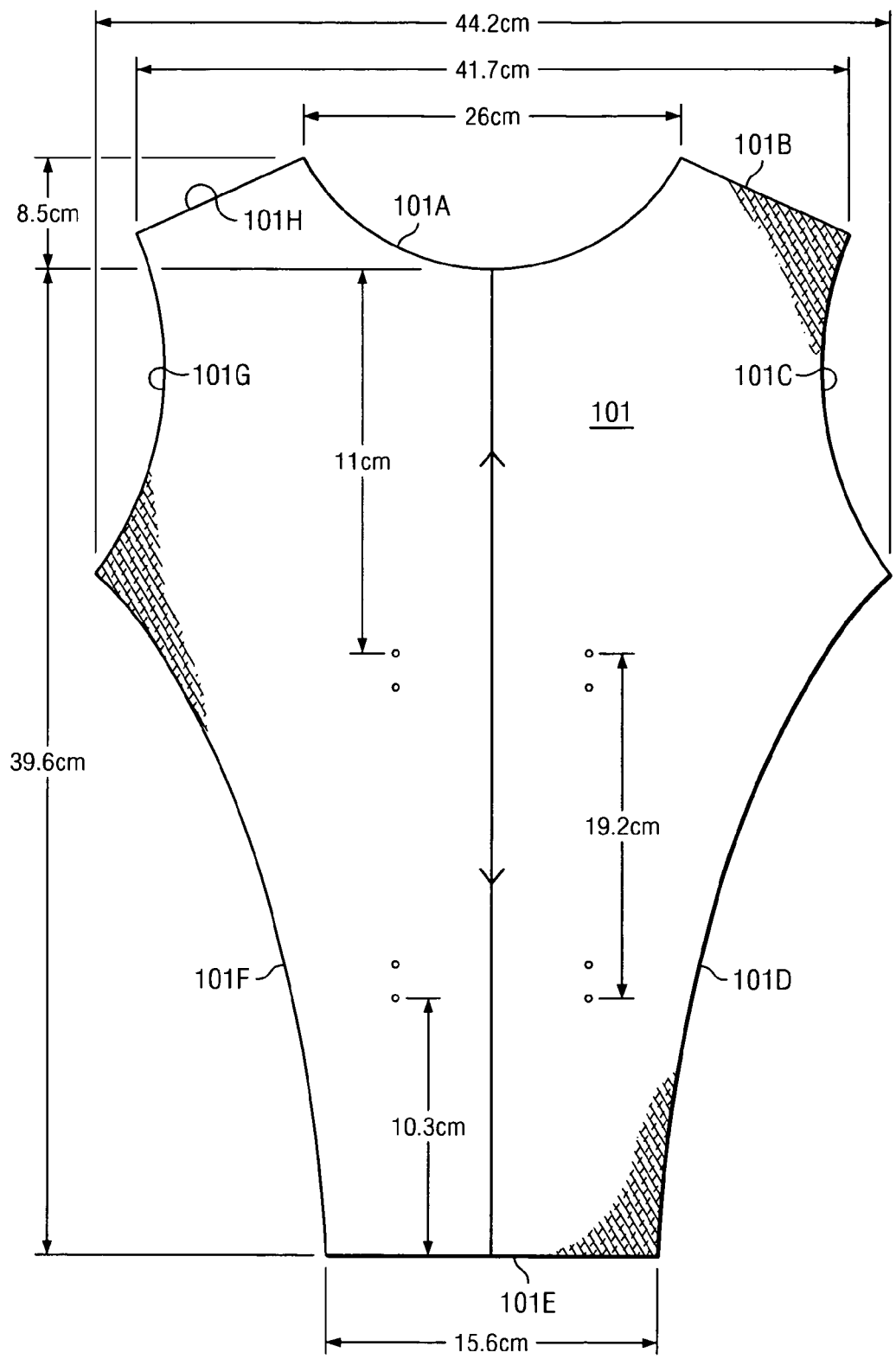
FIGS. 1A-1E are top, two (2) dimensional views of each of the panels used in an embodiment of the present invention illustrating the upper back panel, chest yoke panel, belly panel, left side panel and right side panel
Figure 1B:
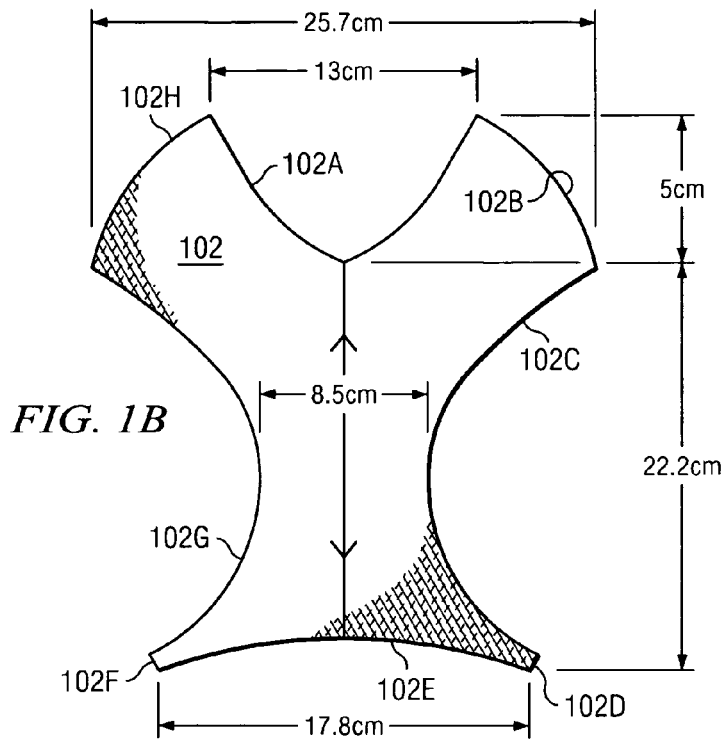
Figure 1C:
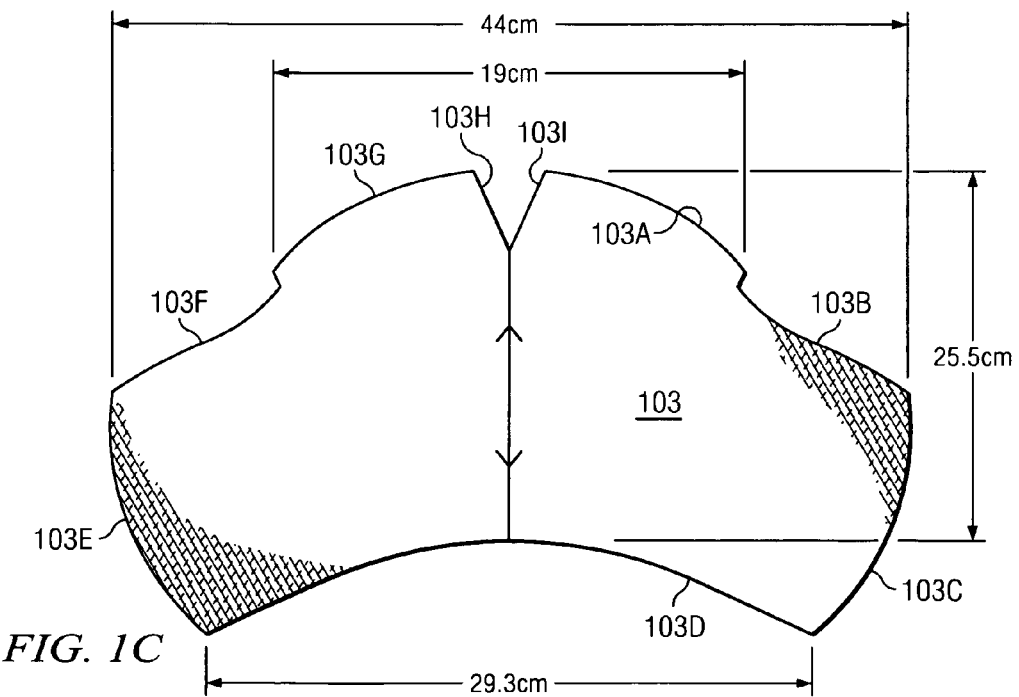
Figure 1D:
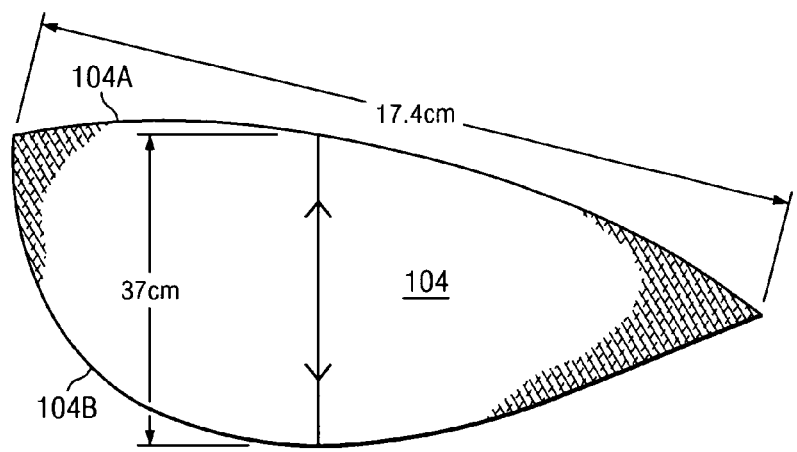
Figure 1E:
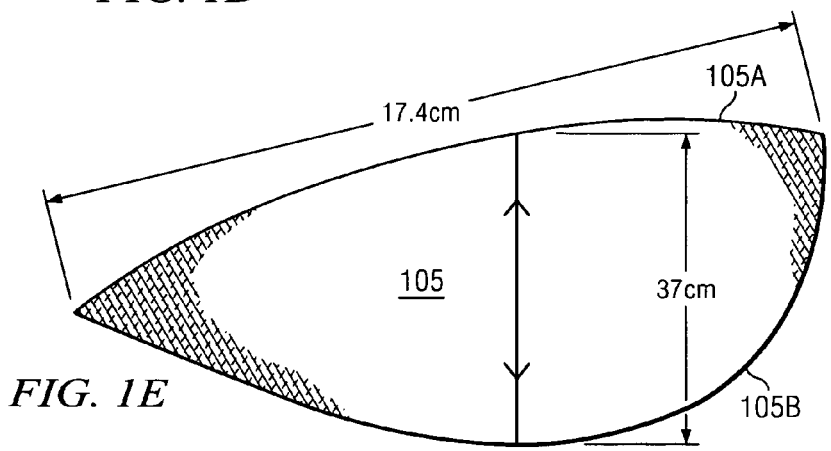

Referring now to FIGS. 1A-1E, the disclosed embodiment is comprised of five (5) panels of resilient nylon fabric encasing buoyancy foam. FIG. 1A illustrates the upper back panel 101. FIG. 1B illustrates the chest yoke panel 102. FIG. 1C illustrates the belly panel 103. FIG. 1D illustrates left side panel 104. FIG. 1E illustrates right side panel 105.

Figure 1F:
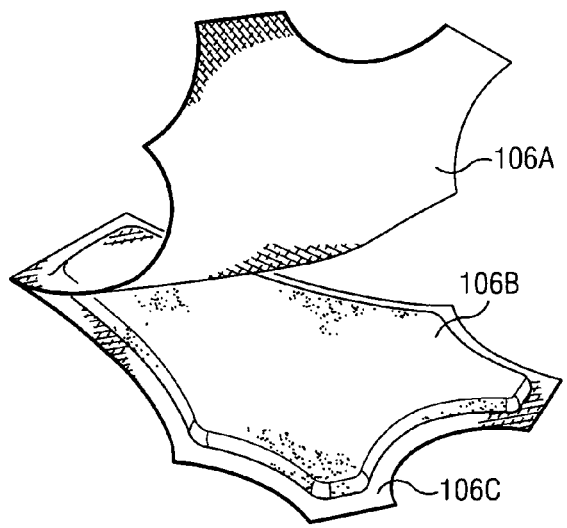
FIG. 1F is a perspective view of the layers of an illustrative panel of the present invention.

More specifically, FIGS. 1A-1E are seen in two dimensional space, wherein upper back panel 101 of FIG. 1A is symmetrical about a central axis, having a plurality of edges 101A-101H, referred to as upper back panel first edge 101A through upper back panel eighth edge 101H. Upper back panel first edge 101A, upper back panel third edge 101C, upper back panel fourth edge 101D, upper back panel sixth edge 101F and upper back panel seventh edge 101G are generally curved and upper back panel second edge 101B, upper back panel fifth edge 101E and upper back panel eighth edge 101H are generally linear. Each upper back panel edge has a first end and a second end. The second end of an upper back panel edge ends at the first end of a successive upper back panel edge. For example, the second end of upper back panel eighth edge 101H ends at the first end of upper back panel first edge 101A. The edges thus define the shape of upper back panel 101. As seen in FIG. 1F, upper back panel 101 comprises a top layer 106A, a foam layer 106B and a bottom layer 106C.

As seen in FIG. 1B, chest yoke panel 102 is symmetrical about a central axis having a plurality edges referred to as chest yoke panel first edge 102A through chest yoke panel eighth edge 102H, of which, chest yoke panel first edge 102A, chest yoke panel second edge 10B, chest yoke panel third edge 102C, chest yoke panel fourth edge 102E, chest yoke panel seventh edge and 102G and chest yoke panel eighth edge 102H have a general curvature and chest yoke panel fourth edge 102D and chest yoke panel sixth edge 102F are linear. Each chest yoke panel edge has a first end and a second end. The second end of a chest yoke panel edge ends at the first end of a successive chest yoke panel edge. For example, the second end of chest yoke panel eighth edge 102H ends at the first end of chest yoke panel first edge 102A. The edges thus define the shape of the chest yoke panel 102.

As seen in FIG. 1C, belly panel 103 is symmetrical about a central axis having a plurality of edges, referred to as belly panel first edge 103A through belly panel ninth edge 103I. Belly panel first edge 103A through belly panel seventh edge 103G are generally curved and belly panel eighth edge 103H and belly panel ninth edge 103I are linear. Each belly panel edge has a first end and a second end. The second end of a belly panel edge ends at the first end of a successive belly panel edge. The edges thus define the shape of the belly panel 103.

FIGS. 1D and 1E illustrate left side panel 104 and right side panel 105 having curved left panel first edge 104A and left panel second edge 104B and right panel first edge 105A and right panel second edges 105B. Each side panel edge has a first end and a second end. The second end of a side panel edge ends at the first end of a successive side panel edge. The edges thus define the shape of the right and left side panels 104, 105.

FIG. 1F illustrates the layers of upper back panel 101, showing top layer 106A and bottom layer 106C encasing buoyancy foam 106B. Each of the chest yoke panel 102, belly panel 103, left side panel 104 and right side panel also are similarly constructed of a top layer, bottom layer and a predetermined density encasing buoyancy foam. In each case, the top layer, having an interior face and an exterior face, comprises a resilient nylon fabric layer such as Cordura®, or similar material and the bottom layer, having an interior face and an exterior face, comprises a nylon fabric layer such as 200 denier nylon. The density of the foam used in each panel determines the relative buoyancy of each portion thereof. In a disclosed embodiment, the density of the encased buoyancy foam in a disclosed embodiment is 20 mm PVC buoyancy for the left side panel 104 and right side panel 105 and chest yoke panel 102 and 5 mm closed cell foam for the belly panel 103. By using less buoyant foam for the belly panel, tipping of the canine in the water is minimized or avoided. The recitation of foam densities is for illustrative purposes only and different densities and compositions can be used to achieve desired buoyancies of the flotation apparatus of the present invention.

Figure 5:
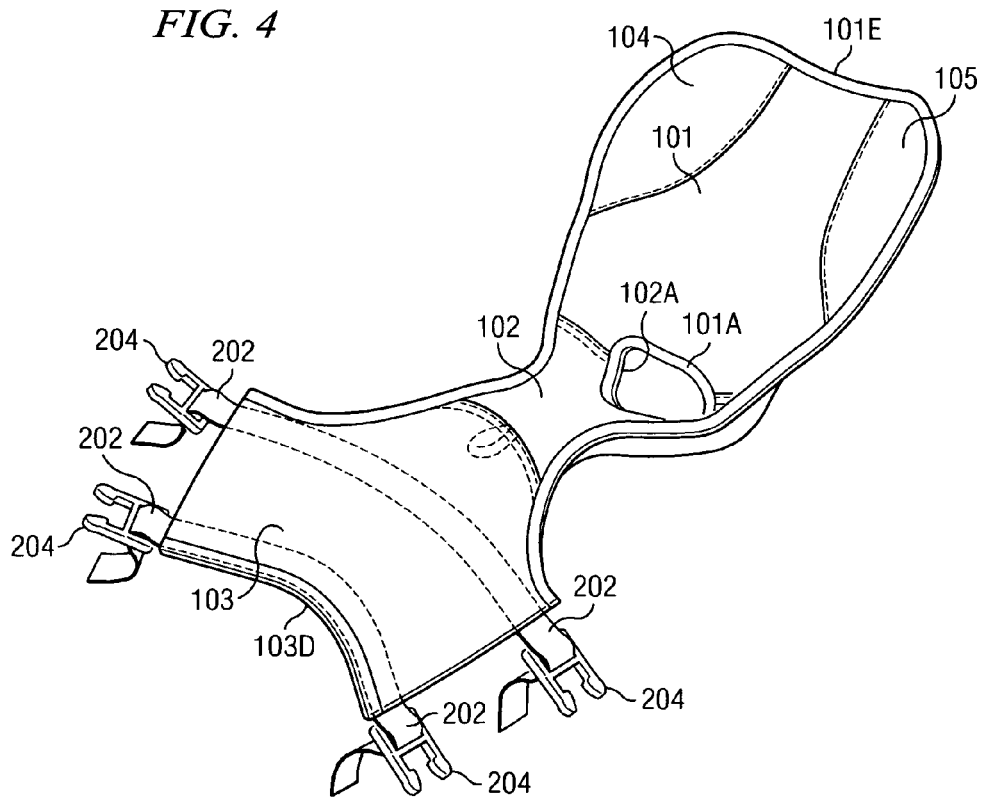
FIG. 5 is a view of the present invention in the open position as would be positioned to receive a canine.

The flotation apparatus of the present invention is fabricated using the components of FIGS. 1A-1E. As seen in FIG. 5, a first set of edges of the upper back panel 101 are coupled to a first set of edges of the chest yoke panel 102, a second set of edges of the chest yoke panel 102 are coupled to a first set of edges of the belly panel 103, a first edge of the left side panel 104 coupled to a second edge of the upper back panel 101 and a first edge of the right side panel 105 is coupled to a third edge of the upper back panel 101.

Figure 4:
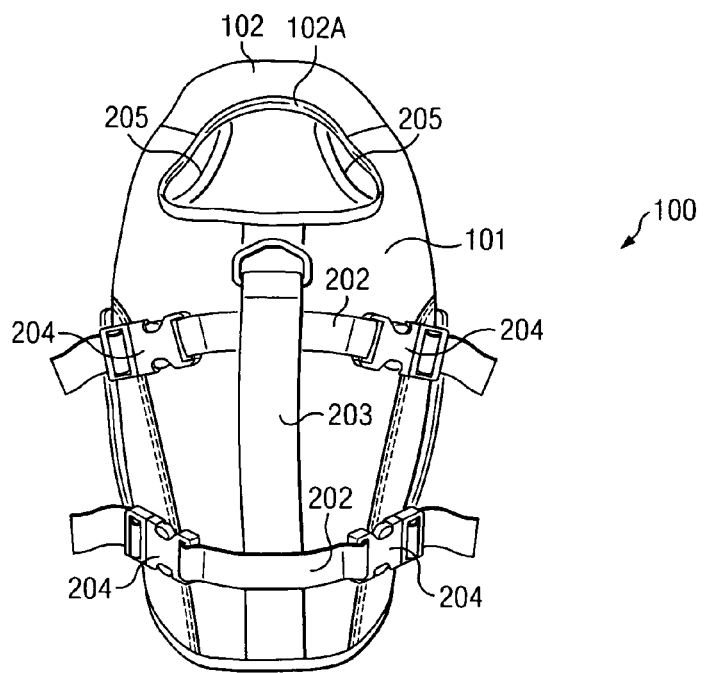
FIG. 4 is a top view of the present invention in the secured position.

As seen in FIG. 4, the coupling of the first set of edges of the upper back panel 101 and the first set of edges of the chest yoke panel 102 form head opening 201 defined by a fourth set of edges of the upper back panel 101 and a third set of edges of the chest yoke panel 102.

The coupling of the plurality of panels can be by heat welding, adhesive or stitching of a thread, cord or monofilament line made of, inter alia, nylon, polyvinylidene fluoride (PVDF, and called fluorocarbon), polyethylene, Dacron and Dyneema (UHMWPE).

Figure 2:
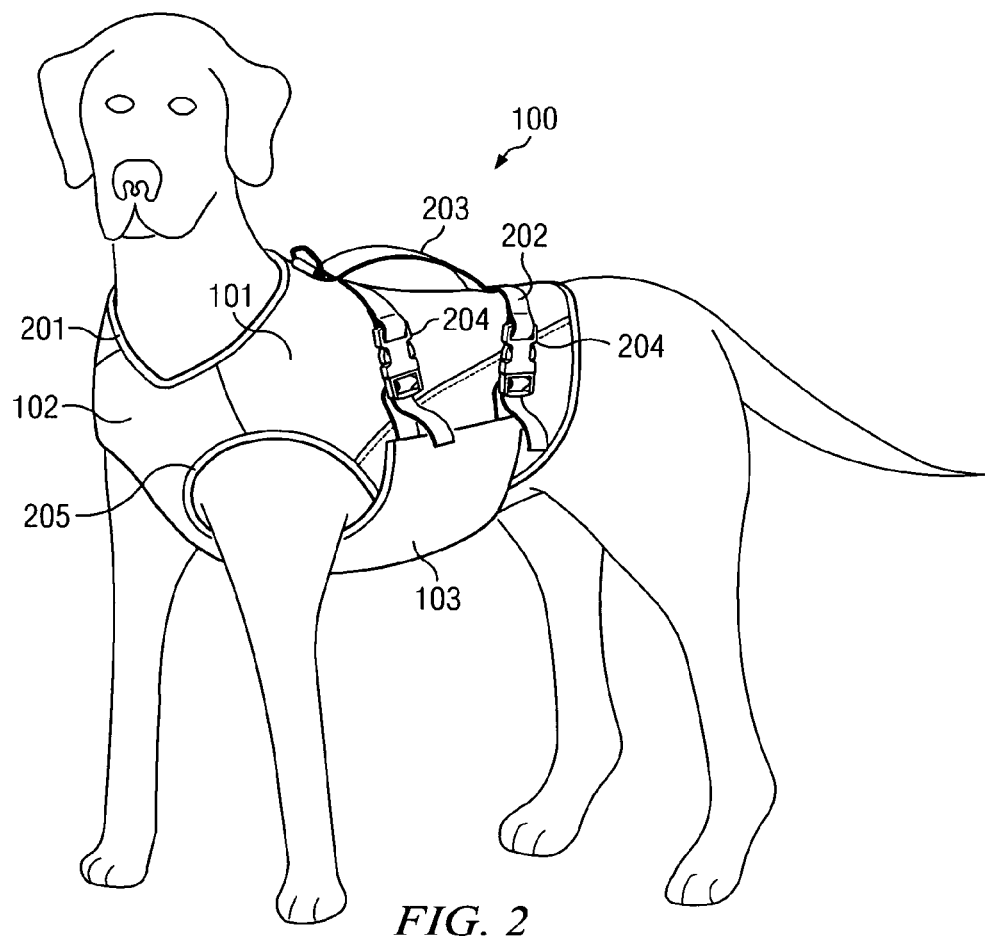
FIG. 2 is a first view of the present invention as worn by a canine.
Figure 3:
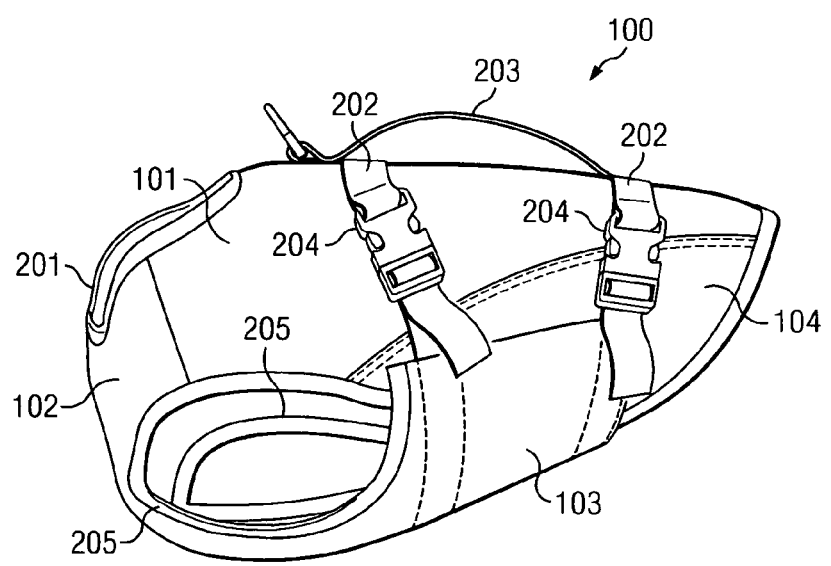
FIG. 3 is a perspective view of the present invention.

As seen in FIG. 2, the flotation apparatus 100 of the present invention has a head opening 201 formed by upper back panel first edge 101A of upper back panel 101 and chest yoke panel edge 102A of chest yoke panel 102. The head opening 201 receives the head of a canine. The upper back panel 101 then lays across the back of a canine and the sides thereof secured to the belly panel 103 with a plurality of coupling means, seen here as lateral straps 202 with quick release buckles 204. The quick release buckles 204 are comprised of a female portion, as seen in FIG. 5 and male portion. The male and female portions of quick release buckles 204 are coupled as seen in FIGS. 2, 3 and 4.

Leg openings 205 as seen in FIG. 2 are formed, as seen in FIG. 5, by upper back panel third edge 101C of upper back panel 101 and chest yoke panel third edge 102C and chest yoke panel seventh edge 102G of chest yoke panel 102, belly panel first edge 103A, belly panel second edge 103B, belly panel sixth edge 103F and belly panel seventh edge 103G of belly panel 103 and a portion of left side panel second edge 104B of left side panel 104 and a portion of right side panel second edge 105B of right side panel 105. The hind quarters of the canine are accommodated from the back of the flotation apparatus 100 formed by edge upper back panel fifth edge 101E of upper back panel 101, belly panel fourth edge 103D of belly panel 103 and a portion of left side panel second edge 104B of left side panel 104 and a portion of right side panel second edge 105B of right side panel 105. As seen in FIGS. 2, 3 and 4, a lifting handle 203 is coupled longitudinally along the central axis on the top of the upper back panel 101.

The disclosed embodiment of the present invention advantageously uses different densities of foam to provide substantially even flotation characteristics based on the location in which it is used. The arrangement, thickness and density of the foam provides stable buoyancy when the canine is in water, it being understood that too much foam, and/or incorrectly positioned foam can result in instability and hence the undesirable tendency of the canine to "roll" in the water.

Unlike conventional canine flotation devices which do not provide flotation means under the chest between the front legs, the chest yoke panel 102 receives the front legs of a canine and joins seamlessly to belly panel 103 as seen in FIG. 5. This arrangement keeps the canine from "hanging" from the flotation apparatus and contributes to the cradling effect. Hence, the canine's head is given additional flotation support.

The disclosed embodiment of the present invention overcomes the further disadvantage of a belly strap that starts behind the front legs. As seen in FIG. 4, the disclosed embodiment of the present invention has a belly panel 103 that is one continuous piece that couples to the chest yoke panel 102, in front of the shoulders, with no external strapping. As seen in FIG. 5, the belly panel strapping is interposed between the interior face of the top layer 106A and the interior face of the bottom layer 106C, either above or below the buoyancy foam 016B. Such an arrangement lessens the risk of snagging on debris in the water, and contributes to increased comfort, fit and buoyancy.

The present invention provides more foam to the chest area so as to support the heavier shoulder and chest/head area. This keeps the canine's head above water and provides insulation to important internal organs proximate that area. Additional foam is provided in the upper back panel 101 and the left side panel 104 and right side panel 105 to improve lateral stability, as noted to prevent the canine from rolling over in the water. 13. In one embodiment of the present invention, the relative thickness or density of the buoyant material provides more buoyancy to the left side panel 104, right side panel 105 and chest yoke panel 102 compared to the belly panel 103. In another embodiment of the present invention, the relative thickness or density of the buoyant material provides more buoyancy to the left side panel 104, right side panel 105 and chest yoke panel 102 compared to the belly panel 103 and upper back panel 101.

The novel and inventive aspects of the disclosed embodiment of the present invention include the chest yoke portion, the use of foam with specific densities and buoyancies in different panels, the use of a seamless belly panel. The advantages provided by the disclosed embodiment of the present invention include greater comfort, greater freedom of movement in the water, better insulation in a core area, better balance of floatation, less risk of snagging portions of the flotation apparatus, assistance in keeping the canine's head above water, and better stability.

A plurality of different materials having the functionality described herein can be used to fabricate the invention. One embodiment of the present invention is fabricated from the following materials. The outer layer 106A can be a nylon fabric, including Cordura®, a Nylon66 product manufactured by INVISTA, the inner layer 106C being a nylon fabric such as a 200 denier nylon. The inner foam used in the disclosed embodiment is, inter alia, a closed cell foam. This variety of foam adequately carries the load and is a tougher, but less buoyant foam so as to assist in stability. An additional embodiment of the present invention features an integrated chest panel and belly panel advantageously dimensioned to provide a more shaped fit and ergonomic feel The embodiments shown and described above are only exemplary. Even though numerous characteristics and advantages of the preferred embodiments of the present invention have been set forth in the foregoing description together with details of the invention, the disclosure is illustrative only and changes may be made within the principles of the invention to the full extent indicated by the broad general meaning of the terms used in the attached claims.

What is claimed is:

1. An improved canine flotation apparatus, comprising a plurality of coupled panels each panel having a top layer, a bottom layer and interposed between the top layer and bottom layer a buoyant material of predetermined density or thickness;
    the plurality of panels further comprising an upper back panel having a plurality of edges, a chest yoke panel having a plurality of edges, a belly panel having a plurality of edges, a left side panel having a plurality of edges and a right side panel having a plurality of edges;
    a first set of edges of the upper back panel coupled to a first set of edges of the chest yoke panel,
    a second set of edges of the chest yoke panel coupled to a first set of edges of the belly panel providing a separate aperture for each front leg of a canine;
    a first edge of the left side panel coupled to a second edge of the upper back panel
    a first edge of the right side panel coupled to a third edge of the upper back panel; and
    each of the plurality of panels having segmented foam of specific densities or thicknesses providing varying amounts of buoyancy to different areas of the apparatus, wherein the relative thickness or density of the buoyant material provides more buoyancy to the left side panel, right side panel and chest yoke panel compared to the belly panel.

2. The improved canine flotation apparatus of claim 1, wherein the coupling of the first set of edges of the upper back panel and the first set of edges of the chest yoke panel form a head opening defined by a fourth set of edges of the upper back panel and a third set of edges of the chest yoke panel.

3. The improved canine flotation apparatus of claim 1, wherein the buoyant material of the upper back portion, chest yoke portion, left side portion and right side portion and belly portion comprises a foam having a predetermined density or thickness.

4. The improved canine flotation apparatus of claim 3, wherein the foam is a closed cell foam.

5. The improved canine flotation apparatus of claim 4, wherein the at least one coupling means comprises at least one strap traverses laterally across the upper back panel and the belly panel, with quick release buckles proximate the ends thereof.

6. The improved canine flotation apparatus of claim 5, wherein the at least one strap traverses laterally between the top layer and bottom layer of the belly panel.

7. The improved canine flotation apparatus of claim 5, comprising two parallel straps traversing laterally across the upper back panel and the belly panel.

8. The improved canine flotation apparatus of claim 1, wherein the upper back panel is secured to the belly panel with at least one coupling means.

9. The improved canine flotation apparatus of claim 1, further comprising a lifting handle coupled longitudinally along a central axis of an exterior face of the upper back panel.

10. The improved canine apparatus of claim 1, wherein the relative thickness or density of the buoyant material provides more buoyancy to the left side panel, right side panel and chest yoke panel compared to the belly panel and upper back panel.

11. The improved canine apparatus of claim 1, wherein the left side panel, right side panel and chest yoke panel comprise 20 mm poly vinyl chloride blend (PVC) and 5 mm closed cell foam.

12. A canine flotation apparatus, comprising:
an upper back panel comprised a top layer and a bottom layer with a buoyant material having a predetermined thickness or density interposed between the top layer and bottom layer;
a chest yoke panel comprised a top layer and a bottom layer with a buoyant material having a predetermined thickness or density between the top layer and bottom layer, the chest yoke panel coupled to the upper back panel, a head opening being formed between the upper back panel and chest yoke panel;
a belly panel having a top layer and bottom layer with a buoyant material having a predetermined thickness or density interposed between the top layer and bottom layer, the belly panel being coupled to the chest yoke panel at an end opposite of the coupling of the chest yoke panel to the upper back panel providing a separate aperture for each front leg of a canine;
each of the plurality of panels having segmented foam of specific densities or thicknesses providing varying amounts of buoyancy to different areas of the apparatus, wherein the relative thickness or density of the buoyant material provides more buoyancy to a left side panel, right side panel and chest yoke panel compared to the belly panel; and
a coupling means coupling the upper back panel to the belly panel.

13. The canine flotation apparatus of claim 12, wherein the edges of the upper back panel, chest yoke panel and belly panel are dimensioned to form a leg opening on a left side of the apparatus and a leg opening on a right side of the apparatus.

14. The canine flotation apparatus of claim 13, wherein the chest yoke panel and belly panel are integrated.

15. The canine flotation apparatus of claim 13, wherein the coupling means comprises a plurality of straps laterally traversing the upper back panel and belly panel with quick release buckles proximate the ends thereof.

16. The canine flotation apparatus of claim 15, wherein the straps laterally traversing the belly panel are interposed between a top layer and bottom layer of the belly panel.

\* \* \* \* \*